US011226301B2

United States Patent
Doege

(10) Patent No.: US 11,226,301 B2
(45) Date of Patent: Jan. 18, 2022

(54) THERMOGRAPHIC EXAMINATION MEANS AND METHOD FOR NON-DESTRUCTIVE EXAMINATION OF A NEAR-SURFACE STRUCTURE AT A TEST OBJECT

(71) Applicant: Fraunhofer-Gesellschaft zur Foerderung der angewandten Forschung e.V., Munich (DE)

(72) Inventor: Jens Doege, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 155 days.

(21) Appl. No.: 15/455,593

(22) Filed: Mar. 10, 2017

(65) Prior Publication Data
US 2017/0184526 A1    Jun. 29, 2017

Related U.S. Application Data

(63) Continuation of application No. PCT/EP2015/070622, filed on Sep. 9, 2015.

(30) Foreign Application Priority Data

Sep. 10, 2014    (DE) .................... 10 2014 218 136.4

(51) Int. Cl.
*G01J 5/00*    (2006.01)
*G01N 25/72*    (2006.01)
(Continued)

(52) U.S. Cl.
CPC ........... *G01N 25/72* (2013.01); *G01B 21/085* (2013.01); *G01N 9/36* (2013.01); *G01J 5/00* (2013.01)

(58) Field of Classification Search
CPC ........ G01N 25/72; G01N 9/36; G01B 21/085; G01J 5/025; G01J 2005/0077;
(Continued)

(56) References Cited

U.S. PATENT DOCUMENTS

| 4,100,809 A | * | 7/1978 | Bobrov | .................... | B06B 1/04 73/609 |
| 4,254,338 A | | 3/1981 | Abel et al. | | |

(Continued)

FOREIGN PATENT DOCUMENTS

| CN | 101606058 A | 12/2009 |
| CN | 102947695 A | 2/2013 |

(Continued)

OTHER PUBLICATIONS

Clemente Ibarra-Castanedo, et al., "Nondestructive Testing With Thermography", European Journal of Physics, Institute of Physics Publishing, Bristol, GB, vol. 34, No. 6 (XP020252366), Oct. 22, 2013.

(Continued)

*Primary Examiner* — Gail Kaplan Verbitsky
(74) *Attorney, Agent, or Firm* — Perkins Coie LLP; Michael A. Glenn

(57) ABSTRACT

A thermographic examination device for non-destructive examination of a near-surface structure at a test object includes a heating device for applying heat energy to a surface region to be heated of the test object; a thermal sensor device for detecting a time profile, following the application of heat energy, of a spatial temperature distribution on a surface region to be measured of the test object, the surface region to be measured including the surface region to be heated as well as an outer surface region to be measured which is adjacent to the surface region to be heated; and an evaluator for evaluating the time profile of the (Continued)

spatial temperature distribution so as to detect at least one parameter of the near-surface structure at the surface region to be measured.

17 Claims, 7 Drawing Sheets

(51) Int. Cl.
*G01B 21/08* (2006.01)
*G01N 9/36* (2006.01)

(58) Field of Classification Search
CPC ............. G01J 5/0003; G01J 2005/0081; G01J 2005/0085; G01J 5/0088; G01J 5/0066; G01J 5/0862; G01J 5/00; H01L 21/67248; H01L 21/67115; H01L 27/14669
USPC ...................................... 252/960; 702/35, 40
See application file for complete search history.

(56) References Cited

U.S. PATENT DOCUMENTS

| | | | | |
|---|---|---|---|---|
| 4,557,607 A * | 12/1985 | Busse | ................... | G01B 11/06 374/121 |
| 4,647,220 A * | 3/1987 | Adams | ................... | G01N 25/72 374/5 |
| 4,965,451 A | 10/1990 | Solter et al. | | |
| 5,433,106 A * | 7/1995 | Matsumura | ............ | G01N 25/72 73/75 |
| 5,582,485 A * | 12/1996 | Lesniak | ................. | G01N 25/72 250/330 |
| 6,019,504 A | 2/2000 | Adams et al. | | |
| 6,130,415 A * | 10/2000 | Knoot | ............... | H01L 21/67248 219/502 |
| 6,387,715 B1 | 5/2002 | Davis et al. | | |
| 6,491,425 B1 * | 12/2002 | Hammiche | ............ | B82Y 35/00 374/10 |
| 6,712,502 B2 * | 3/2004 | Zalameda | ................. | G01J 5/62 374/124 |
| 7,976,215 B2 * | 7/2011 | Kim | ....................... | G01N 25/18 374/121 |
| 8,506,159 B2 * | 8/2013 | Nakagawa | ............. | G01N 25/72 374/5 |
| 8,766,193 B2 * | 7/2014 | Reinke | ................... | G01N 21/55 250/341.1 |
| 9,025,020 B2 * | 5/2015 | Deslandes | ............ | G01R 35/005 348/92 |
| 9,129,368 B2 * | 9/2015 | Seki | ..................... | G01J 5/0003 |
| 9,494,468 B2 * | 11/2016 | Wolfgruber | ............ | G01N 25/72 |
| 10,753,895 B2 * | 8/2020 | Nagano | ................. | G01B 21/00 |
| 2002/0027941 A1 | 3/2002 | Schlagheck et al. | | |
| 2002/0110177 A1 * | 8/2002 | Nakayama | ............ | G11B 9/1409 374/44 |
| 2002/0128797 A1 * | 9/2002 | Sun | ....................... | G01B 11/06 702/172 |
| 2004/0076216 A1 | 4/2004 | Chamberlain et al. | | |
| 2006/0029121 A1 * | 2/2006 | Boehmisch | ............ | G01N 25/72 374/45 |
| 2006/0114965 A1 * | 6/2006 | Murphy | .................. | G01K 1/02 374/120 |
| 2007/0180897 A1 * | 8/2007 | Dankert | ................ | F01D 21/003 73/112.01 |
| 2007/0299628 A1 * | 12/2007 | Sun | ....................... | G01B 21/085 702/170 |
| 2008/0137105 A1 | 6/2008 | Howard et al. | | |
| 2008/0291465 A1 | 11/2008 | Lorraine et al. | | |
| 2008/0307886 A1 | 12/2008 | Marsh et al. | | |
| 2009/0245321 A1 | 10/2009 | Ringermacher et al. | | |
| 2013/0077650 A1 * | 3/2013 | Traxler | ................. | G06T 7/0004 374/5 |
| 2013/0261989 A1 * | 10/2013 | Plotnikov | ............. | G01N 25/72 702/40 |
| 2014/0175071 A1 | 6/2014 | Pfitzner et al. | | |
| 2014/0334519 A1 * | 11/2014 | Antonini | ............... | G01K 1/143 374/124 |
| 2015/0198547 A1 * | 7/2015 | Isakov | ................... | G01J 5/089 374/121 |
| 2015/0253266 A1 * | 9/2015 | Lucon | .................... | G01N 25/72 374/4 |
| 2015/0260667 A1 * | 9/2015 | Isakov | ................... | G01N 25/72 374/5 |
| 2016/0202126 A1 * | 7/2016 | Schmidt | ................. | G01N 25/72 250/342 |
| 2016/0356734 A1 * | 12/2016 | Ja | ........................... | G01N 25/72 |
| 2017/0023505 A1 * | 1/2017 | Maione | ............... | G01M 5/0033 |
| 2017/0030847 A1 * | 2/2017 | Wolfgruber | ............. | G01J 5/02 |
| 2017/0212066 A1 * | 7/2017 | Thompson | ............. | G01N 25/72 |
| 2017/0356844 A1 * | 12/2017 | Bleuler | .................... | G01N 1/42 |
| 2019/0300205 A1 * | 10/2019 | Georgeson | ............. | G01N 25/72 |

FOREIGN PATENT DOCUMENTS

| | | | |
|---|---|---|---|
| DE | DD286228 A | * | 1/1991 |
| DE | 19623121 A1 | | 12/1997 |
| DE | 19703484 A1 | | 8/1998 |
| DE | 19838858 A1 | | 4/1999 |
| DE | 112009000634 T5 | | 2/2011 |
| EP | 0347641 A2 | | 12/1989 |
| GB | 2235604 A | | 3/1991 |
| JP | 57163856 A | | 10/1982 |
| JP | 6258146 A | | 3/1987 |
| JP | H1082620 A | | 3/1998 |
| JP | 2000161943 A | * | 6/2000 |
| JP | 2010512509 A | | 4/2010 |
| KR | 20130043105 A | | 4/2013 |
| WO | 2013000622 A1 | | 1/2013 |
| WO | 2013052527 A1 | | 4/2013 |

OTHER PUBLICATIONS

Lit, et al., "Crack Imaging by Scanning Laser Line-Line Thermography and Laser-Spot Thermography; Crack Imaging By Scanning LTT and LST", Measurement Science and Technology, IOP, Bristol, GB, vol. 22, No. 3 (XP020191583), Feb. 1, 2011, 35701.

Omar, M et al., "Infrared thermography for inspecting the adhesion integrity of plastic welded joints", NDT & E International, vol. 39, Issue 1, 2006, pp. 1-7.

Schlichting, Joachim et al., "Defect Sizing By Local Excitation Thermography", QIRT Journal—Quantitative Infrared Thermography: An International Journal On IR Thermography, vol. 8, No. 1; Jun. 30, 2011, pp. 51-63 (XP055229690), Jun. 30, 2011, 51-63.

Verney, B et al., "Multimodal Fusion Systems For NDT and Metrology", QIRT 2014 (xp055230580), Jul. 11, 2014.

* cited by examiner

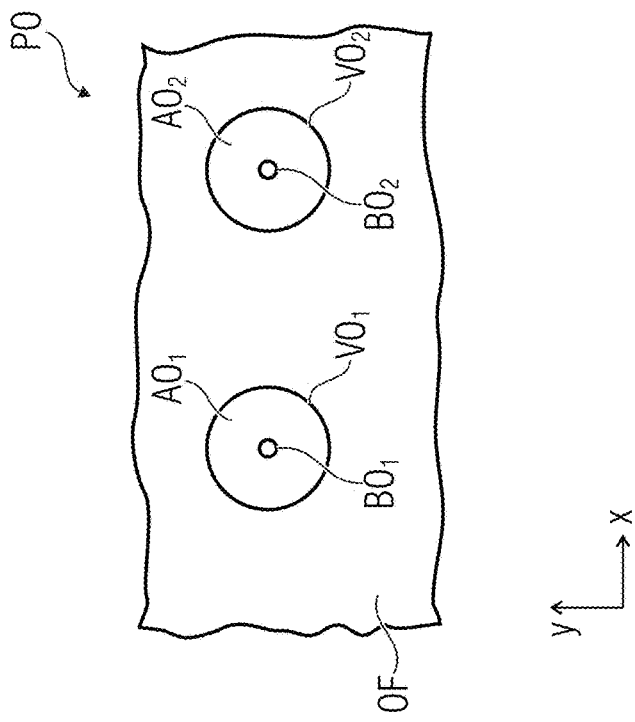
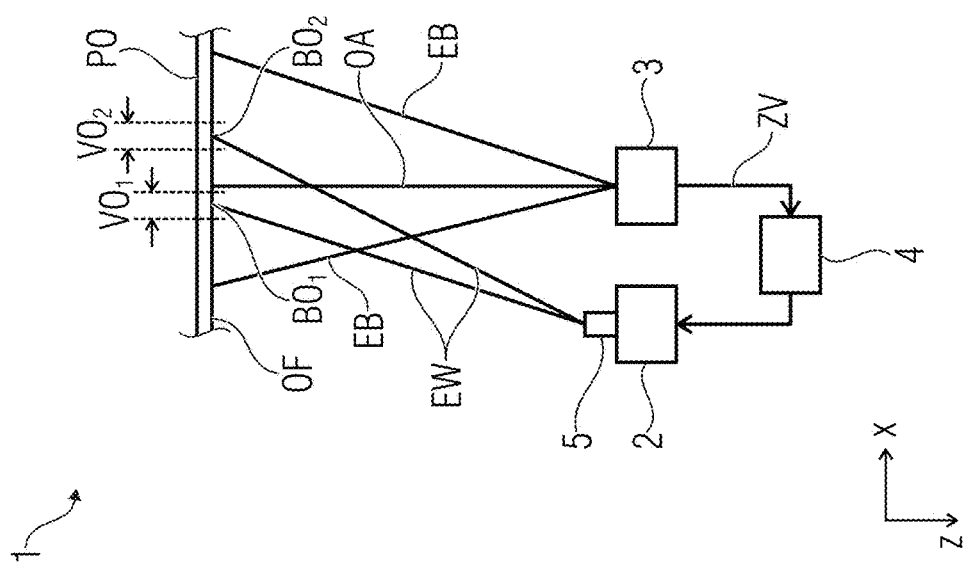
Fig. 5

THERMOGRAPHIC EXAMINATION MEANS AND METHOD FOR NON-DESTRUCTIVE EXAMINATION OF A NEAR-SURFACE STRUCTURE AT A TEST OBJECT

CROSS-REFERENCE TO RELATED APPLICATIONS

This application is a continuation of copending International Application No. PCT/EP2015/070622, filed Sep. 9, 2015, which is incorporated herein by reference in its entirety, and additionally claims priority from German Application No. DE 102014218136.4, filed Sep. 10, 2014, which is incorporated herein by reference in its entirety.

BACKGROUND OF THE INVENTION

When producing parts, in particular parts having small wall thicknesses, it is important for stability and, thus, also for the quality to stick to a defined wall thickness. In particular with methods having a relatively large amount of dispersions, such as lamination, dead-mold casting or centrifugal casting, for example, it is useful to metrologically verify the achieved value on a continuing basis so as to be able to recognize near-surface defects such as delaminations (lamination process), gas inclusions (dead-mold casting) or insufficient wall thicknesses (centrifugal casting). The requirement placed upon a measuring device include, depending on the field of application, a short measuring time for process integration, a small amount of stress on the object to be tested, which is caused, e.g., by heat input in case of irradiation, as well as a long life and low cost.

An established method of three-dimensional detection of the inner structure of objects is represented by computer tomography, wherein the object of measurement is irradiated by X rays from different directions, and wherein a 3D object is reconstructed from the individual X-ray images.

There are computer tomographs of different sizes, resolutions and speeds. If a high measurement speed is desired, the technical expenditure and, thus, the costs are so high that this measuring method in many cases cannot be employed economically.

An approach to reducing the cost is offered by thermographic methods. By means of thermographic methods (thermography) it is possible to examine test pieces close to the surface and, in particular, test pieces having low wall thicknesses.

In some thermographic methods, the surface of the test piece is subjected to short-term heating and/or cooling by means of a heat source or heat sink acting in a two-dimensional manner, and the subsequent time profile of the surface temperature is registered by means of a thermal imaging camera (infrared camera) and is subsequently evaluated. While taking into account the material parameters such as the thermal conductivity, specific heat capacity and density while using the heat equation, geometric properties such as the depth of a gas inclusion or the thickness of a topmost layer may then be derived from the time profile of the surface temperature. What is important here are that the region examined extends sufficiently parallel to the surface, as well as differences in terms of the thermal properties of the structural features to be determined. Examples of such thermographic methods are known from source [1].

Moreover, solutions are known from conventional technology wherein local heating of the surface is achieved, e.g., by means of a laser point, and a thermography system is optically tracked by a point detector. This solution enables achieving a fixed time constant between illumination and heat detection even in slow-scanning systems on the basis of point detectors. Examples thereof may be found in sources [2], [3], [4] and [5].

From source [6], a simplified method is known wherein the surface temperature at a specific point in time is detected rather than the time profile of the surface temperature.

Source [7] provides a general overview of thermographic methods.

SUMMARY

According to an embodiment, a thermographic examination means for non-destructive examination of a near-surface structure at a test object may have: a heating device for applying heat energy to a surface region to be heated of the test object; a thermal sensor means for detecting a time profile, following the application of heat energy, of a spatial temperature distribution on a surface region to be measured of the test object, the surface region to be measured including the surface region to be heated as well as an outer surface region to be measured which is adjacent to the surface region to be heated; and an evaluation means for evaluating the time profile of the spatial temperature distribution so as to detect at least one parameter of the near-surface structure at the surface region to be measured.

According to another embodiment, a method for non-destructive examination of a near-surface structure at a test object may have the steps of: applying heat energy to a surface region to be heated of the test object by means of a heating means; detecting a time profile, following the application of heat energy, of a spatial temperature distribution on a surface region to be measured at the test object by means of a thermal sensor means, the surface region to be measured including the surface region to be heated as well as an outer surface region which is adjacent to the surface region to be heated; and evaluating the time profile of the spatial temperature distribution by means of an evaluation means so as to detect at least one parameter of the near-surface structure at the surface region to be measured.

In the solutions known from sources [1] to [7], an amount of heat is applied to a surface region, which is to be heated, of the test piece, and the surface temperature of this very surface region to be heated is measured. By means of the heat propagation perpendicular to the surface region, the thermal properties at the surface region to be heated or the differences of the thermal properties of surface regions, which are to be heated and are measured one after the other, of the test piece are determined, which differences will then form the basis for determining parameters of a near-surface structure of the test piece.

In contrast thereto, provision is made, in accordance with the invention, for spatial temperature distribution to be determined, said temperature distribution being determined not only for the surface region to be heated but also for an outer surface region to be measured, which is adjacent to the surface region to be heated. The surface region to be heated and the outer surface region to be measured form the entire surface region to be measured.

In order to determine meaningful spatial temperature distribution, it is useful, in principle, to detect the respective temperature present at at least two different measuring points at the surface region to be measured. However, bearing in mind the goal of achieving improved and more accurate evaluability, a significantly larger number of different measuring points may be provided. For example, 10 to 500 different measuring points may be provided.

In this context it is essential to provide at least one measuring point at the surface region to be heated and to provide at least one further measuring point at the outer surface region to be measured.

In accordance with the invention, provision is made for repeatedly detecting the spatial temperature distribution at different points in time so as to thus detect a time profile of the spatial temperature distribution for the surface region to be measured. The time profile of the spatial temperature distribution may then be analyzed by means of the heat equation, for example, said analysis then serving to determine at least one parameter of the near-surface structure of the test object.

During certain times, or at certain points in time following the heat input, the close surroundings may be measured by means of a matrix thermal imaging camera, for example. This involves registering also the time profile of the superficial heat distribution in addition to the location of the heat input. The spatial temperature increase at the individual points of the surroundings around the location of the heat input may be fitted by a suitable function, e.g., by solving the heat equation. Thus, the thermal properties may be inferred even in the event of very defective, or noisy, images and thermography video sequences, or in the event of objects of measurement that are not in a thermally balanced state, e.g., due to heating or cooling. By taking into account the relative behavior with regard to the surroundings that are not directly heated by the heat input, the results may be improved.

Said distributions may be used for drawing conclusions as to the propagation of heat and, thus, the depth of the contiguous region of constant thermal material parameters.

By determining the time profile of the spatial temperature distribution in a region which is larger than the region to be heated, superposed independent external effects such as changes in the ambient temperature, for example, or superposed independent internal effects such as deficiencies of the measurement system due to noise or to defective calibration, for example, may be compensated for, unlike previously known solutions, wherein only the time profile of the temperature at the region to be heated is determined. As a result, the parameters of interest of the near-surface structure of the test piece may be detected more accurately than has been possible so far.

Particularly with very small temperature changes in the order of magnitude of the resolution of the thermal sensor means, noise has a considerable effect on the measurement accuracy of the system. In conventional technology, one has tried to address this problem by means of improved and, thus, more costly measurement technology or by means of increased heat input, i.e., by means of a higher starting temperature of the surface to be heated. For a large number of applications, e.g., in the food industry, however, the heat input may be restricted in order to maintain the cold chain. Since with the inventive solution, noise can be better compensated for than has been possible in conventional technology, the amount of heat input can also be reduced as compared to conventional technology, so that the field of application of the examination means increases.

In accordance with an advantageous further development of the invention, the parameter is a thickness of a wall of the test object. In practice, it is desirable in many cases to be able to identify the thickness of a wall of a test object in a non-destructive manner. This is true, in particular, for hollow bodies of all kinds, for example for technical hollow bodies such as containers or conduits or for hollow bodies provided as foodstuffs, such as hollow chocolate bodies, for example.

In accordance with an advantageous further development of the invention, the parameter is a density of a wall of the test object. Moreover, it is frequently desirable in practice to be able to identify the density of a wall of the test object in a non-destructive manner. This is particularly true for cast bodies wherein a change in density is an indication of an inclusion of foreign matter. In particular, air inclusions present within the cast body may thus be identified.

In accordance with a convenient further development of the invention, the surface region to be heated is configured to be point-shaped; to be linear in the form of an open curve; to be linear in the form of a closed curve; to be circular or elliptical. Input of the amount of heat may be effected in a highly concentrated and/or focused manner, so that the amount of heat may be kept small. Experiments have shown that particularly accurate results will be achieved when the surface region to be heated has the form of a linear closed curve. In this case, it is possible, specifically, to evaluate the spatial temperature distribution occurring at the surface both within the region enclosed by the curve and outside thereof.

In accordance with an advantageous further development of the invention, the surface region to be heated comprises at least two spaced-apart surface subregions to be heated, which are parts of the same surface region to be measured. In this context, both that part of the surface which is located between the surface subregions to be heated and that part of the surface which is not located between the surface subregions to be heated may be examined in terms of spatial temperature distribution, which may further increase the level of accuracy of the measurement.

In accordance with an advantageous further development of the invention, the heating means is configured to apply heat energy to the surface region to be heated by means of electromagnetic waves. The electromagnetic waves may be microwaves, light waves or laser light waves, for example. What is particularly advantageous here is that the heating means may be arranged at a distance from the test piece, so that the heating means will not impair the detection region of the thermal sensor means.

In accordance with a convenient further development of the invention, the heating means is configured to apply heat energy to the surface region to be heated by means of mechanical excitation. Said mechanical excitation may make contact or may be effected in a contactless manner, for example by means of ultrasound.

In accordance with an advantageous further development of the invention, the heating means is configured to apply heat energy to the surface region to be heated by means of thermal conduction. In this manner, our concentrated heat input may be achieved, so that the amount of heat may be particularly small.

In accordance with a convenient further development of the invention, the heating means is configured to apply heat energy to the surface region to be heated by generating an electrical current at the surface region to be heated. In this manner, the heat energy may be applied in a virtually loss-free manner to the surface region to be heated.

In accordance with an advantageous further development of the invention, the thermal sensor means comprises a one-dimensional sensor, for example a digital line sensor. For example, the sensor may be a CCD line sensor, a CMOS line sensor or an analog line sensor. Such line sensors are available at low cost and are particularly suitable in case the spatial temperature distribution is to be determined in a one-dimensional, i.e., linear, manner. In principle, however, it is also possible to generate a two-dimensional heat image by means of several linear shots while using line sensors.

In accordance with a convenient further development of the invention, the thermal sensor means comprises a two-dimensional sensor, for example a digital image sensor. Said sensor may be a CCD matrix sensor, a CMOS matrix sensor or an analog matrix sensor, for example. Such sensors are also available at low cost; however, they enable a two-dimensional heat image to be captured by using only one shot.

In accordance with a particularly advantageous further development of the invention, the heating means is configured to apply heat energy in a simultaneous or time-overlapping manner to several surface regions to be heated, the thermal sensor means being configured to detect, in a simultaneous or time-overlapping manner, those time profiles of the spatial temperature distributions which follow the application of heat energy, on several surface regions of the test object that are to be measured, the surface regions to be measured each including one of the surface regions to be heated as well as one outer surface region adjacent to the respective surface region to be heated; and wherein the evaluation means is configured to evaluate the time profiles of the spatial temperature distributions in a simultaneously or time-overlapping manner so as to detect in a simultaneously or time-overlapping manner at least one parameter of the near-surface structure at several surface regions to be measured.

"Simultaneously" here is supposed to mean that the respective events start at the same point in time and end at the same point in time. Moreover, "time-overlapping" is understood to mean that the start of a later event lies between the start and the end of the former event.

Within the context of this further development of the invention it is possible to examine a multitude of surface regions with a short time period.

If the heating means is configured to emit electromagnetic waves, the heating means may comprise optics which focus the generated electromagnetic waves onto several surface regions to be heated.

In accordance with an advantageous further development of the invention, the evaluation means is configured to take into account a spatial profile of an inclination of the surface region to be measured with regard to an optical axis of the thermal sensor means in the evaluation of the time profile of the spatial temperature distribution.

For an accurate evaluation of the heat flux within the test object it is useful to determine the temperature distribution along the surface. Due to perspective distortions, for example on account of the optical properties of the thermal sensor means, it is not possible, however, to determine the temperature distribution directly along the surface. In particular, this applies when the line of vision, i.e., the optical axis, of the thermal sensor means is not perpendicularly incident on the respective point of measurement, which is the case in particular with a planar surface of the test object that is inclined with regard to a plane arranged perpendicularly to the optical axis, or with a curved surface of the test object, which is obviously inclined at least in some regions with regard to a plane arranged perpendicularly to the optical axis.

In addition, with inclined and in particular with curved surfaces the problem arises that the size and shape of the surface region to be heated may depend on the inclination and/or curvature of the surfaces, so that the amount of heat specific to the respective surface area also varies.

By taking into account the spatial profile of the inclination of the surface region to be measured with regard to the optical axis of the thermal sensor means, errors due to perspective distortions as well as errors due to variations in the amount of heat specific to the surface area may be compensated for.

In accordance with an advantageous further development of the invention, the heating device is configured such that application of heat energy to the surface region, that is to be heated, of the test object is effected as a function of the spatial profile of the inclination.

As a result, it is possible to subjected the input of the amount of heat to open-loop or closed-loop control, depending on the spatial profile of the inclination. For example, the power of the heating device or the duration of action of the heating device may be subjected to open-loop or closed-loop control. In this manner, both local overheating of the test object in case the surface region to be heated is almost perpendicular to the direction of heat application, and an unevaluably small amount of heating of the test object in case the surface region to be heated is almost parallel to the direction of heat application, can be avoided.

In accordance with an advantageous further development of the invention, the thermographic examination means comprises an inclination detection means for detecting the spatial profile of the inclination. For example, the inclination detection means may include a laser light section camera. By means of the optical laser light section camera, the position of the point of incidence at the test object as well as the curvature and the orientation of the surface may be easily determined due to triangulation by means of a known optical path of the heating means.

To this end, the position of the surface region to be heated may be used for enabling exact localization thereof in the spatial profile of the inclination. If need be, an additional line may be generated by means of the laser used for heating or by means of a separate laser in order to increase the area covered and to thus increase resolution. In other words, the spatial profile of the inclination may initially be detected separately from the heating process at a high resolution, in which case the surface region to be heated may serve as a reference for rendering the spatial profile of the inclination and the spatial temperature distribution congruent.

In this manner, it is also possible for test objects having complex outer shapes to be examined without said shapes being explicitly known.

In accordance with an advantageous further development of the invention, the thermographic examination means includes a casting mold for producing a calibration body, in particular a wedge-shaped calibration body. The heat input by means of irradiation is dependent on the spectral and spatial distribution of the power and on the surface area irradiated by the source as well as on the reflection and/or absorption coefficient of the surface. Due to the multitude of influential factors and due to the fact that their magnitudes are sometimes variable or not easy to identify, calibration of the arrangement prior to examining the near-surface structure is advantageous. To this end, a calibration body may be used which has a wedge shape with known thicknesses ranging from the lower to the upper values that can be identified and which has been produced from the same material as the object of measurement. The casting mold provided enables easily producing calibration bodies which correspond to the respective test object.

In a further aspect, the object is solved by a method for non-destructive examination of a near-surface structure at a test object, including the steps of applying heat energy to a surface region to be heated of the test object by means of a heating means;

detecting a time profile, following the application of heat energy, of a spatial temperature distribution on a surface region to be measured at the test object by means of a thermal sensor means, the surface region to be measured including the surface region to be heated as well as an outer surface region which is adjacent to the surface region to be heated; and evaluating the time profile of the spatial temperature distribution by means of an evaluation means so as to detect at least one parameter of the near-surface structure at the surface region to be measured.

The advantages discussed within the context of the inventive thermographic examination means result. It is understood that the inventive method may include further method steps which will be described within the context of the inventive thermographic examination means.

BRIEF DESCRIPTION OF THE DRAWINGS

Embodiments of the present invention will be detailed subsequently referring to the appended drawings, in which:

FIG. 5 shows a schematic top view of a second embodiment of an inventive thermographic examination means as well as a pertinent schematic front view of a test object in a magnified representation;

DETAILED DESCRIPTION OF THE INVENTION

Figure 1:
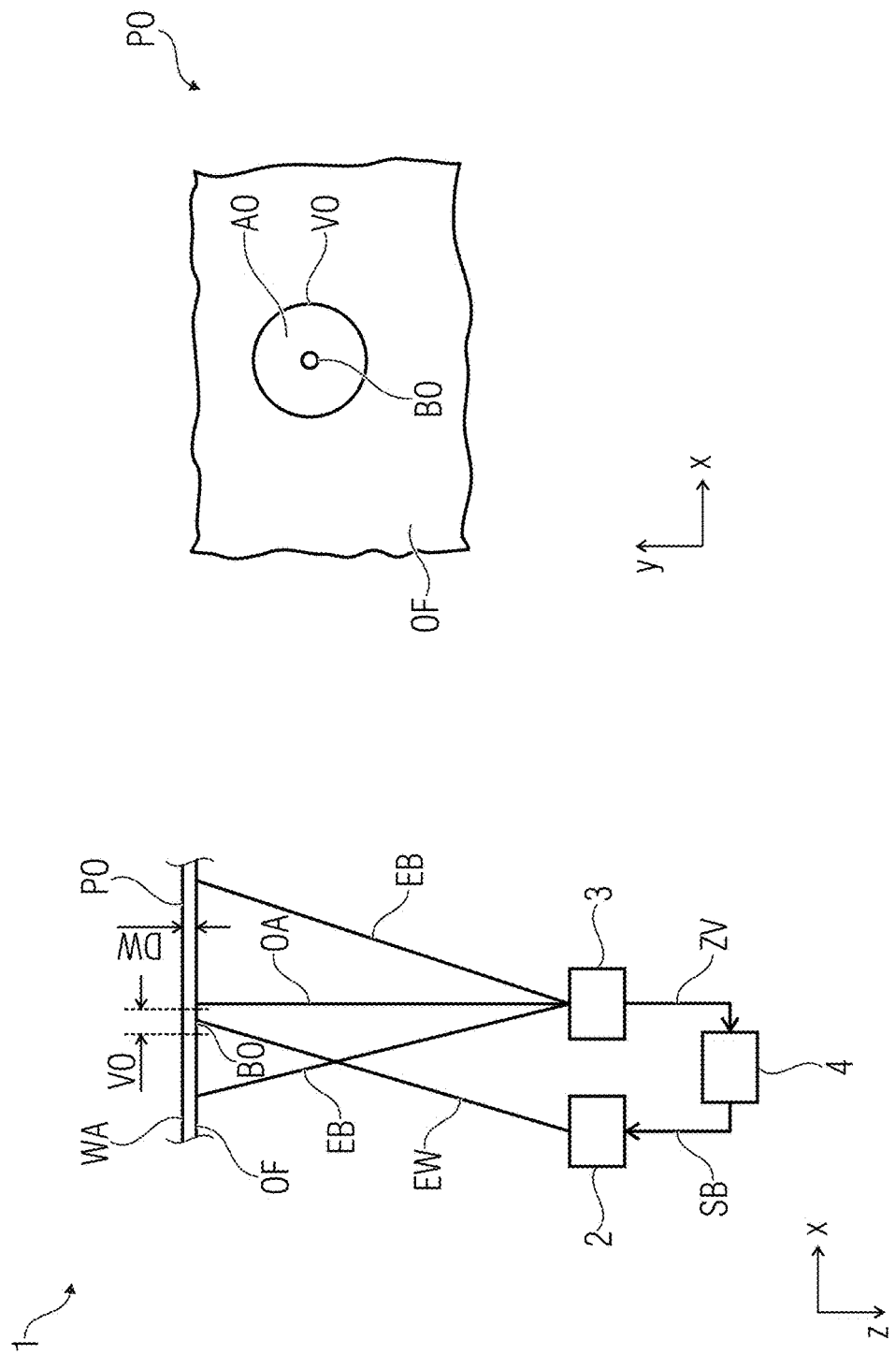
FIG. 1 shows a schematic top view of a first embodiment of an inventive thermographic examination means as well as a pertinent schematic front view of a test object in a magnified representation.

Elements which are identical or similar or elements having identical or equivalent functions will be provided with identical or similar reference numerals below.

In the description which follows, embodiments having a multitude of features of the present invention will be described in more detail so as to provide improved understanding of the invention. However, it is to be noted that the present invention may also be implemented while omitting individual ones of the features described. It shall also be noted that the features shown in various embodiments may also be combined in a different manner unless this is explicitly ruled out or would lead to conflicts.

FIG. 1 shows a schematic top view of a first embodiment of an inventive thermographic examination means 1 as well as a pertinent schematic front view of a test object PO in a magnified representation.

The thermographic examination means 1 includes:

a heating device 2 for applying heat energy to a surface region to be heated BO of the test object PO;

a thermal sensor means 3 for detecting a time profile, following the application of heat energy, of a spatial temperature distribution on a surface region to be measured VO of the test object PO, the surface region to be measured VO including the surface region to be heated BO as well as an outer surface region to be measured AO which is adjacent to the surface region to be heated BO; and an evaluation means 4 for evaluating the time profile of the spatial temperature distribution so as to detect at least one parameter DW of the near-surface structure at the surface region to be measured VO.

In the solutions known from sources [1] to [7], an amount of heat is applied to a surface region, which is to be heated, of the test piece, and the surface temperature of this very surface region to be heated is measured. By means of the heat propagation perpendicular to the surface region, the thermal properties at the surface region to be heated or the differences of the thermal properties of surface regions, which are to be heated and are measured one after the other, of the test piece are determined, which differences will then form the basis for determining parameters of a near-surface structure of the test piece.

In contrast thereto, provision is made, in accordance with the invention, for spatial temperature distribution to be determined, said temperature distribution being determined not only for the surface region to be heated BO but also for an outer surface region to be measured AO, which is adjacent to the surface region to be heated BO. The surface region to be heated BO and the outer surface region to be measured AO form the entire surface region to be measured VO.

In order to determine meaningful spatial temperature distribution, it is useful, in principle, to detect the respective temperature present at at least two different measuring points at the surface region to be measured VO. However, bearing in mind the goal of achieving improved and more accurate evaluability, a significantly larger number of different measuring points may be provided. For example, 10 to 500 different measuring points may be provided.

In this context it is essential to provide at least one measuring point at the surface region to be heated BO and to provide at least one further measuring point at the outer surface region to be measured AO.

In accordance with the invention, provision is made for repeatedly detecting the spatial temperature distribution at different points in time so as to thus detect a time profile of the spatial temperature distribution for the surface region to be measured VO. The time profile of the spatial temperature distribution may then be analyzed by means of the heat equation, for example, said analysis then serving to determine at least one parameter DW of the near-surface structure of the test object PO.

During certain times, or at certain points in time following the heat input, the close surroundings VO may be measured by means of a matrix thermal imaging camera 3, for example. The matrix thermal imaging camera 3 comprises an optical axis OA located centrally within the detection region EB. The above involves registering also the time profile of the superficial heat distribution within the surface region to be measured VO in addition to the location BO of the heat input. The spatial temperature increase at the individual points of the surroundings around the location of the heat input may be fitted by a suitable function, e.g., by solving the heat equation. Thus, the thermal properties may be inferred even in the event of very defective, or noisy, images and thermography video sequences, or in the event of objects of measurement that are not in a thermally balanced state, e.g., due to heating or cooling. By taking into account the relative behavior with regard to the surroundings that are not directly heated by the heat input AO, the results may be improved.

Said distributions may be used for drawing conclusions as to the two-dimensional propagation of heat and, thus, the depth DW of the contiguous region of constant thermal material parameters.

By determining the time profile of the spatial temperature distribution in a region VO which is larger than the region to be heated OB, superposed independent external effects such as changes in the ambient temperature, for example, or superposed independent internal effects such as deficiencies of the measurement system 3 due to noise or to defective calibration, for example, may be compensated for, unlike previously known solutions, wherein only the time profile of the temperature at the region to be heated is determined. As a result, the parameters of interest DW of the near-surface structure of the test piece PO may be detected more accurately than has been possible so far.

Particularly with very small temperature changes in the order of magnitude of the resolution of the thermal sensor means 3, noise has a considerable effect on the measurement accuracy of the system 1. In conventional technology, one has tried to address this problem by means of improved and, thus, more costly measurement technology or by means of increased heat input, i.e., by means of a higher starting temperature of the surface to be heated. For a large number of applications, e.g., in the food industry, however, the heat input may be restricted in order to maintain the cold chain. Since with the inventive solution, noise can be better compensated for than has been possible in conventional technology, the amount of heat input can also be reduced as compared to conventional technology, so that the field of application of the examination means 1 increases.

To achieve a compact arrangement and the possibility of easy orientation of the heating means 2 with regard to the thermal sensor means 3, a mirror might be provided within the optical path of the heating means 2.

In accordance with an advantageous further development of the invention, the parameter DW is a thickness DW of a wall WA of the test object PO. In practice, it is desirable in many cases to be able to identify the thickness DW of a wall WA of a test object PO in a non-destructive manner. This is true, in particular, for hollow bodies PO of all kinds, for example for technical hollow bodies such as containers or conduits or for hollow bodies provided as foodstuffs, such as hollow chocolate bodies PO, for example.

In accordance with an advantageous further development of the invention, the parameter DW is a density of a wall of the test object PO. Moreover, it is frequently desirable in practice to be able to identify the density of a wall WA of the test object PO in a non-destructive manner. This is particularly true for cast bodies PO wherein a change in density is an indication of an inclusion of foreign matter. In particular, air inclusions present within the cast body PO may thus be identified.

In accordance with a convenient further development of the invention, the surface region to be heated BO is configured to be point-shaped; to be linear in the form of an open curve; to be linear in the form of a closed curve; to be circular or elliptical. Input of the amount of heat may be effected in a highly concentrated and/or focused manner, so that the amount of heat may be kept small. Experiments have shown that particularly accurate results will be achieved when the surface region to be heated BO has the form of a linear closed curve. In this case, it is possible, specifically, to evaluate the spatial temperature distribution OTV occurring at the surface OF both within the region enclosed by the curve OB and outside thereof.

In accordance with an advantageous further development of the invention, the surface region to be heated BO comprises at least two spaced-apart surface subregions to be heated, which are parts of the same surface region to be measured VO. In this context, both that part of the surface OF which is located between the surface subregions to be heated and that part of the surface OF which is not located between the surface subregions to be heated may be examined in terms of spatial temperature distribution OTV, which may further increase the level of accuracy of the measurement.

In accordance with an advantageous further development of the invention, the heating means 3 is configured to apply heat energy to the surface region to be heated BO by means of electromagnetic waves EW. The electromagnetic waves EW may be microwaves, light waves or laser light waves, for example. What is particularly advantageous here is that the heating means 2 may be arranged at a distance from the test piece PO, so that the heating means 2 will not impair the detection region EB of the thermal sensor means 3.

In accordance with a convenient further development (not shown) of the invention, the heating means 2 is configured to apply heat energy to the surface region to be heated OB by means of mechanical excitation. Said mechanical excitation may make contact or may be effected in a contactless manner, for example by means of ultrasound.

In accordance with an advantageous further development (not shown) of the invention, the heating means 2 is configured to apply heat energy to the surface region to be heated OB by means of thermal conduction. In this manner, our concentrated heat input may be achieved, so that the amount of heat may be particularly small.

In accordance with a convenient further development (not shown) of the invention, the heating means 2 is configured to apply heat energy to the surface region to be heated OB by generating an electrical current at the surface region to be heated OB. In this manner, the heat energy may be applied in a virtually loss-free manner to the surface region to be heated.

In accordance with an advantageous further development (not shown) of the invention, the thermal sensor means 3 comprises a one-dimensional sensor, for example a digital line sensor. For example, the sensor may be a CCD line sensor, a CMOS line sensor or an analog line sensor. Such line sensors are available at low cost and are particularly suitable in case the spatial temperature distribution is to be determined in a one-dimensional, i.e., linear, manner. In principle, however, it is also possible to generate a two-dimensional heat image by means of several linear shots while using line sensors.

In accordance with a convenient further development of the invention, the thermal sensor means 3 comprises a two-dimensional sensor, for example a digital image sensor. Said sensor may be a CCD matrix sensor, a CMOS matrix sensor or an analog matrix sensor, for example. Such sensors are also available at low cost; however, they enable a two-dimensional heat image to be captured by using only one shot.

In a further aspect, the invention includes a method for non-destructive examination of a near-surface structure at a test object, which includes the following steps:

applying heat energy to a surface region to be heated BO of the test object PO by means of a heating means 2;

detecting a time profile ZV, following the application of heat energy, of a spatial temperature distribution OTV on a surface region to be measured VO at the test object PO by means of a thermal sensor means 3, the surface region to be measured VO including the surface region to be heated BO as well as an outer surface region AO which is adjacent to the surface region to be heated BO; and evaluating the time profile ZV of the spatial temperature distribution OTV by means of an evaluation means 4 so as to detect at least one parameter DW of the near-surface structure at the surface region to be measured VO.

Figure 2:
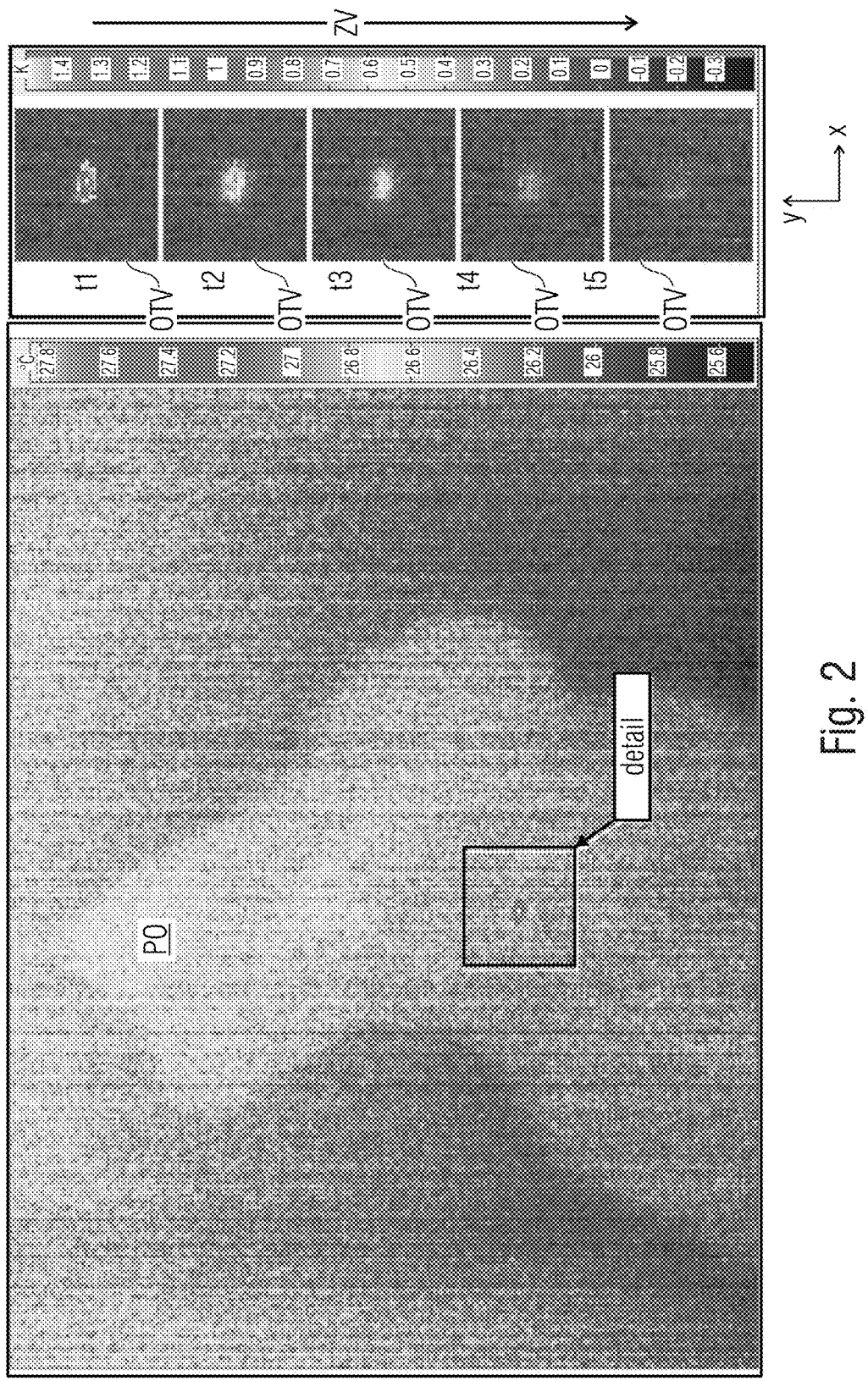
FIG. 2 shows an exemplary heat image of a test object as well as a magnified exemplary time profile of a spatial temperature distribution in the form of heat images, captured in a temporally offset manner, in the region of a surface region, that is to be measured, at the test object.

FIG. 2 shows an exemplary heat image of a test object PO as well as a magnified exemplary time profile ZV of a spatial temperature distribution OTV in the form of heat images captured in a temporally offset manner, in a region of a surface region to be measured VO at the test object PO.

The thermal sensor means 3 may serve to detect over time the surface temperature of the object of measurement PO in the region surrounding the point BO heated by the radiation. In FIG. 2, this circumstance is depicted with the object of measurement PO, which has been heated up at certain points, on the left-hand side.

The time profile ZV of the spatial temperature distribution OTV is depicted by heat images which were captured in a two-dimensional manner at the times t1, t2, t3, t4 and t5 and which are depicted on the right-hand side of FIG. 2.

In particular with very small temperature increases with regard to the thermal resolution of the thermal sensor means 3, there is the problem that the measured heat distribution is superposed by its noise. This circumstance can easily be seen in FIG. 2 by means of the color-coded temperature distribution.

Instead of a point BO, several points BO may be mapped simultaneously or—on the part of the scanner—one after the other onto the object of measurement by means of optics (diffractive optical element—DOE). Thermal detection is then be performed individually for each image or be effected at a sufficiently small time distance from the action of heat.

Figure 3:
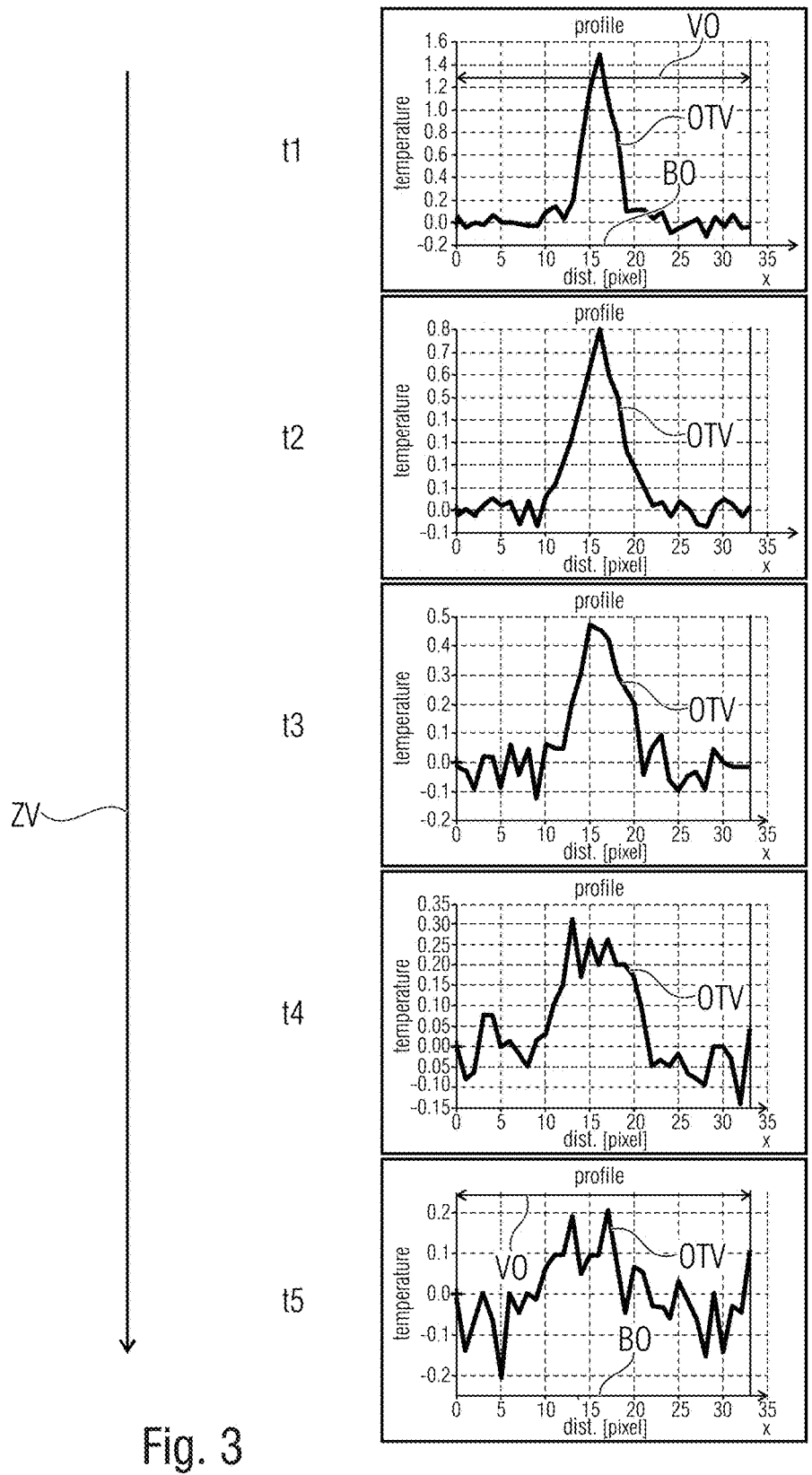
FIG. 3 shows the exemplary time profile of the spatial temperature distribution in the form of temporally offset position/temperature profiles.

FIG. 3 shows the exemplarily time profile ZV of the spatial temperature distribution OTV in the form of temporally offset position/temperature profiles OTV. The position/temperature profiles OTV indicate the temperature distributions at the times t1, t2, t3, t4 and t5 in a one-dimensional manner, namely in the x direction.

Figure 4:
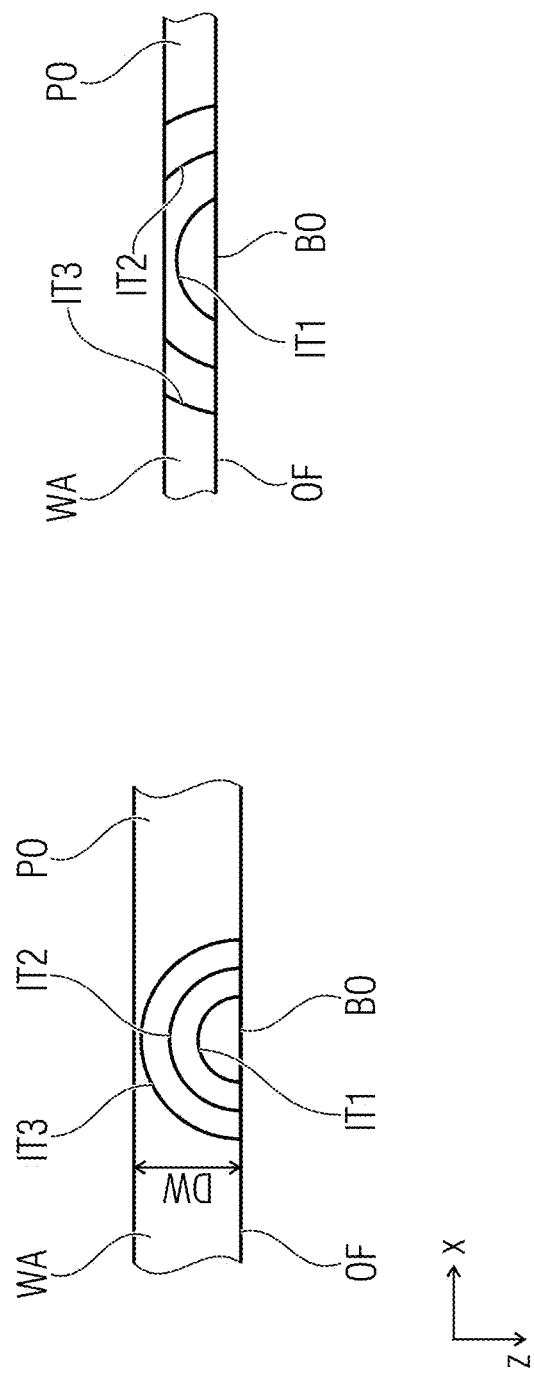
FIG. 4 shows an exemplary temperature distribution in a sectional top view of a test object having a large thickness of the wall as well as an exemplary temperature distribution in a sectional top view of a test object having a smaller thickness of the wall.

On the left-hand side, FIG. 4 shows an exemplary temperature distribution in a sectional top view of a test object PO having a large thickness DW of the wall WA, and on the right-hand side, an exemplarily temperature distribution in a sectional top view of a test object PO having a smaller thickness DW of the wall WA. The temperature distributions are depicted by isotherms IT1, IT2, IT3, i.e. lines of the same temperature, in each case.

One can clearly see from FIG. 4 that, all other things held constant, a reduction in the thickness DW of the wall WA results in that the isotherms extend across a larger region in the x direction, i.e. in parallel with the surface OF.

Due to heat conduction, the heat energy propagates within the object of measurement, which may be detected by means of a changing heat distribution at the surface OF. This is shown on the right-hand side of FIG. 2 with the time profile of the temperature distribution OTV in the range of a few seconds. For thick and thin walls WA, the two propagation variants are depicted in FIG. 4. Thus, given a volume that is infinitely extended in the direction of depth and has a high thermal conductivity, the propagation is in the direction of depth, i.e. in the z direction, and in the transverse direction, i.e. in the x direction, and in the event of a flat volume, it is essentially in the transverse direction. By means of the time profile and/or the heat distribution at specific defined points in time, the thickness DW of the walls WA of the object of measurement PO and/or the shape of the body may be determined by means of a consistently high level of heat conduction.

The various influential factors, temperature of the object of measurement EW and ambient temperature, air movement and/or radiation of the environment as well as the specific heat capacity and thermal conductivity of the object of measurement, determine the connection between initial heat input, temperature at the beginning of the measurement, propagation of the heat within the object of measurement PO and, thus, the time profile, which may be identified on the surface OF, of the spatial temperature distribution OTV. The emissivity defines the connection between the actual surface temperature and the identified radiation within the wavelength range of the thermal imaging camera.

FIG. 5 shows a schematic top view of a second embodiment of an inventive thermographic examination means 1 as well as a pertinent schematic front view of a test object PO in a magnified representation.

In accordance with a particularly advantageous further development of the invention, the heating means 2 is configured to apply heat energy in a simultaneous or time-overlapping manner to several surface regions to be heated $BO_1$, $BO_2$, the thermal sensor means 3 being configured to detect, in a simultaneous or time-overlapping manner, those time profiles of the spatial temperature distributions which follow the application of heat energy, on several surface regions of the test object PO that are to be measured $VO_1$, $VO_2$, the surface regions to be measured $VO_1$, $VO_2$ each including one of the surface regions to be heated $BO_1$, $BO_2$ as well as one outer surface region $AO_1$, $AO_2$ adjacent to the respective surface region to be heated $BO_1$, $BO_2$; and wherein the evaluation means 4 is configured to evaluate the time profiles of the spatial temperature distributions in a simultaneously or time-overlapping manner so as to detect in a simultaneously or time-overlapping manner at least one parameter DW of the near-surface structure at several surface regions to be measured $VO_1$, $VO_2$.

"Simultaneously" here is supposed to mean that the respective events start at the same point in time and end at the same point in time. Moreover, "time-overlapping" is understood to mean that the start of a later event lies between the start and the end of the former event.

Within the context of this further development of the invention it is possible to examine a multitude of surface regions $VO_1$, $VO_2$ with a short time period.

If the heating means 2 is configured to emit electromagnetic waves EW, the heating means 2 may comprise optics 5 which focus the generated electromagnetic waves EW onto several surface regions to be heated $BO_1$, $BO_2$.

Figure 6:
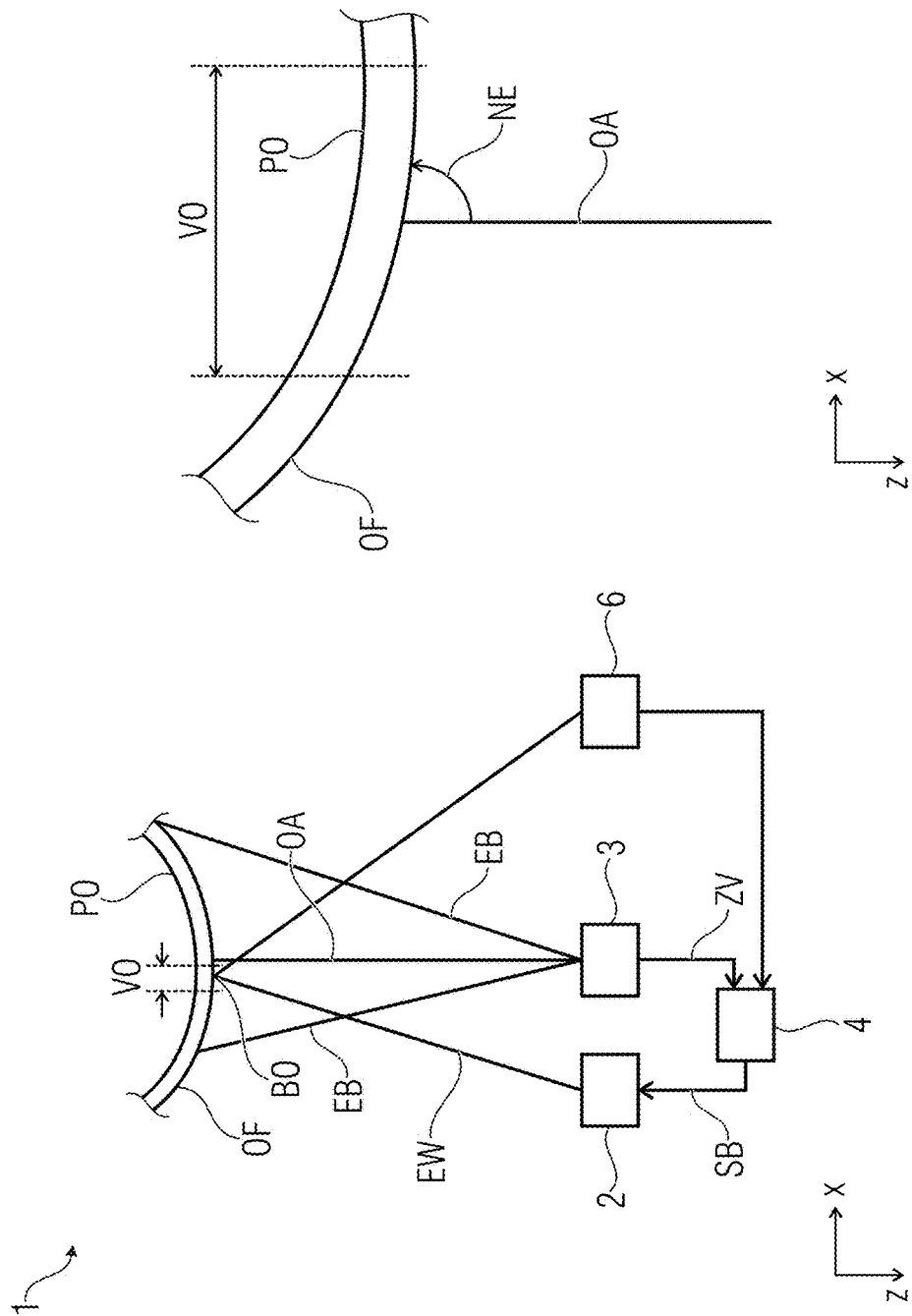
FIG. 6 shows a schematic top view of a third embodiment of an inventive thermographic examination means as well as a pertinent schematic front view of a test object in a magnified representation.

FIG. 6 shows a schematic top view of a third embodiment of an inventive thermographic examination means 1 as well as a pertinent schematic front view of a test object PO in a magnified representation. In FIG. 6, the heating device 2, the thermal sensor means 3 and the inclination detection means 6 are depicted to be within one plane. This is only due to reasons related to drawing. In reality, it is more favorable for the heating device 2 and the thermal sensor means 3 to span a first plane, and for the thermal sensor means 3 and the inclination detection means 6 to span a second plane, which planes are arranged at right angles in relation to each other, for example.

In accordance with an advantageous further development of the invention, the evaluation means 4 is configured to take into account a spatial profile of an inclination NE of the surface region to be measured VO with regard to an optical axis OA of the thermal sensor means 3 in the evaluation of the time profile of the spatial temperature distribution.

For an accurate evaluation of the heat flux within the test object PO it is useful to determine the temperature distribution along the surface OF. Due to perspective distortions, for example on account of the optical properties of the thermal sensor means 3, it is not possible, however, to determine the temperature distribution directly along the surface. In particular, this applies when the line of vision, i.e., the optical axis OA, of the thermal sensor means 3 is not perpendicularly incident on the respective point of measurement, which is the case in particular with a planar surface OF of the test object PO that is inclined with regard to a plane arranged perpendicularly to the optical axis OA, or with a curved surface OF of the test object PO, which is obviously inclined at least in some regions with regard to a plane arranged perpendicularly to the optical axis OA.

In addition, with inclined and in particular with curved surfaces OF the problem arises that the size and shape of the surface region to be heated BO may depend on the inclination and/or curvature of the surfaces OF, so that the amount of heat specific to the respective surface area also varies.

By taking into account the spatial profile of the inclination NE of the surface region to be measured VO with regard to the optical axis OA of the thermal sensor means 3, errors due to perspective distortions as well as errors due to variations in the amount of heat specific to the surface area may be compensated for.

In accordance with an advantageous further development of the invention, the heating device 2 is configured such that application of heat energy to the surface region BO, that is to be heated, of the test object PO is effected as a function of the spatial profile of the inclination NE.

As a result, it is possible to subjected the input of the amount of heat to open-loop or closed-loop control, depending on the spatial profile of the inclination NE. For example, the power of the heating device 2 or the duration of action of the heating device 2 may be subjected to open-loop or closed-loop control. In this manner, local overheating of the test object PO in case the surface region to be heated BO is almost perpendicular to the direction of heat application, on the one hand, and an unevaluably small amount of heating of the test object PO in case the surface region to be heated OB is almost parallel to the direction of heat application, on the other hand, can be avoided.

In accordance with an advantageous further development of the invention, the thermographic examination means 1 comprises an inclination detection means 6 for detecting the spatial profile of the inclination NE. For example, the inclination detection means 6 may include a laser light section camera 6. By means of the optical laser light section camera 6, the position of the point of incidence at the test object PO as well as the curvature and the orientation of the surface OF may be easily determined due to triangulation by means of a known optical path of the heating means 2. The laser light section camera 6 may be tuned to a spectrum of the heating means 2.

To this end, the position of the surface region to be heated may be used for enabling exact localization thereof. If need be, an additional line may be generated by means of the laser used for heating or by means of a separate laser in order to increase the area covered and to thus increase resolution. In other words, the spatial profile of the inclination NE may initially be detected separately from the heating process at a high resolution, in which case the surface region to be heated BO may serve as a reference for rendering the spatial profile of the inclination NE and the spatial temperature distribution OTV congruent.

In this manner, it is also possible for test objects having complex outer shapes to be examined without said shapes being explicitly known.

Figure 7:
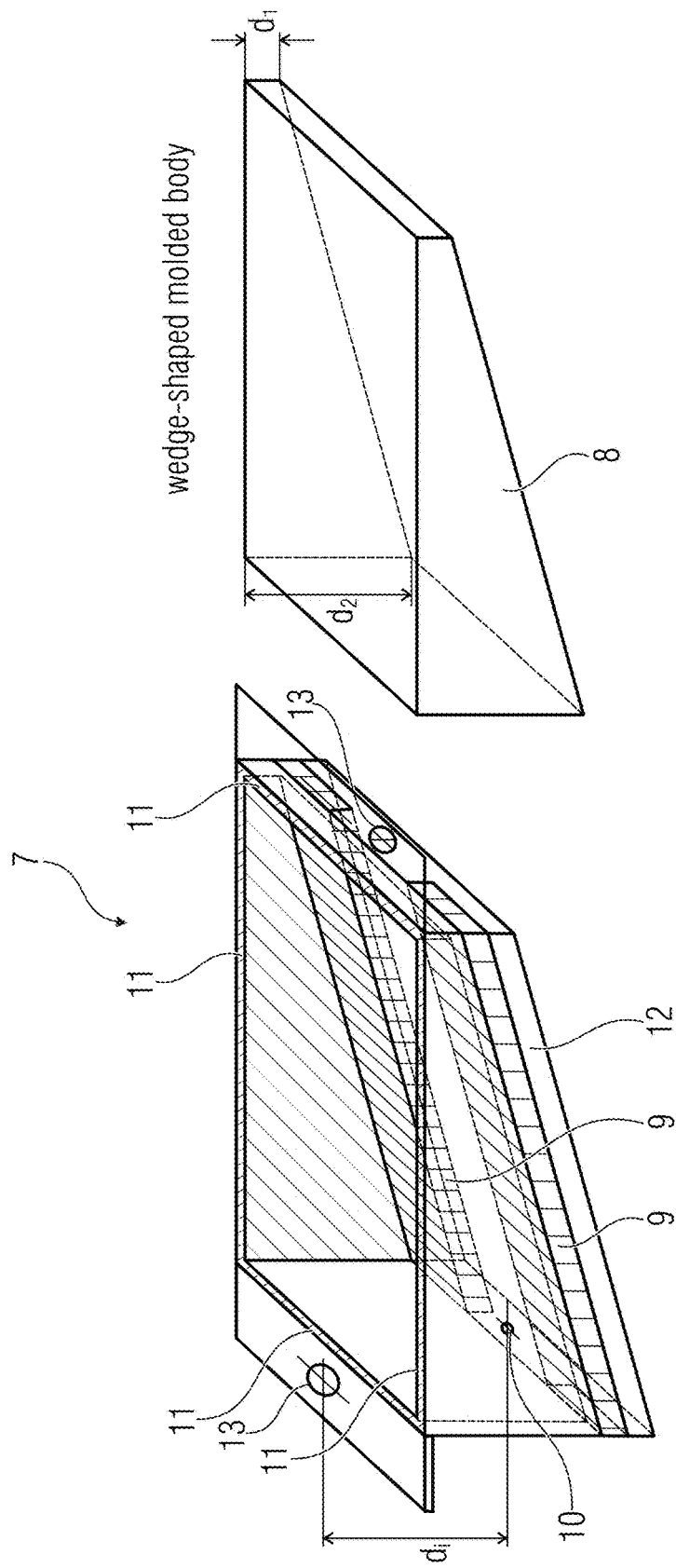
FIG. 7 shows a schematic three-dimensional representation of a casting mold for producing a calibration body as well as a schematic three-dimensional representation of a calibration body produced by means of the casting mold.

FIG. 7 shows a schematic three-dimensional representation of a casting mold for producing a calibration body as well as a schematic three-dimensional representation of a calibration body produced by means of the casting mold.

In accordance with an advantageous further development of the invention, the thermographic examination means 1 includes a casting mold 7 for producing a calibration body 8, in particular a wedge-shaped calibration body 8. The heat input by means of irradiation is dependent on the spectral and spatial distribution of the power and on the surface area irradiated by the source as well as on the reflection and/or absorption coefficient of the surface. Due to the multitude of influential factors and due to the fact that their magnitudes are sometimes variable or not easy to identify, calibration of the arrangement 1 prior to examining the near-surface structure is advantageous. To this end, a calibration body 8 may be used which has a wedge shape with known thicknesses d1 and d2 ranging from the lower to the upper values that can be identified and which has been produced from the same material as the object of measurement PO. The casting mold 7 provided enables easily producing calibration bodies 8 which correspond to the respective test object PO.

The casting mold 7 comprises a bottom 9 which includes a slit 10 and extends along that direction in which the thickness d of the calibration body 8 changes. In addition, the casting mold 7 has four lateral walls 11 as well as a closure 12 for the slit 10. The casting mold 7 is open at the top, so that it may be filled with the castable material when the slot 10 is closed with the closure 12. Once the castable material has solidified, the closure 12 may be removed so that the underside of the calibration body 8 is exposed in the region of the slit 10. Now the calibration body 8, which is still located within the casting mold 7, may be used for calibration since the temperature propagation within the calibration body 8 in the region of the slot 10 is virtually not influenced by the casting mold 7. The markings 13 serve to position the calibration body 8 during calibration.

The casting mold 7 depicted in FIG. 7 is provided for producing a calibration body 8 from a castable material. The mold 7 is configured such that the closure 12 is removable, so that the calibration body 8 is exposed above a slot 10. By means of markings 13, the position of the center of the slot 10 and the thickness of the calibration body 8 may be read out from outside along the straight connecting line between both markings 13 and may be taken into account in the calibration. For identifying the optical parameters, the calibration body 8 is rotated about a suitable rotary axis. In this manner it is possible to determine the influence that the surface properties have on the measurement process.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

SOURCES

[1] US 2004/0076216 A1
[2] US 2008/0137105 A1
[3] GB 2 235 604 A
[4] US 2008/0291465 A1
[5] US 2008/0307886 A1
[6] U.S. Pat. No. 6,387,715 B1
[7] Infrared thermography for inspecting the adhesion integrity of plastic welded joints, M Omar, M Hassan, K Donohue, K Saito, R Alloo—NDT & E International, Volume 39, Issue 1, Pages 1-7, 2006

The invention claimed is:

1. A thermographic examination device for non-destructive examination of a near-surface structure at a test object, comprising
    a heating device for directly applying heat energy to a surface region to be heated of the test object;
    a thermal sensor device for detecting a time profile, following the application of heat energy, of a spatial temperature distribution on a surface region to be measured of the test object, the surface region to be measured comprising the surface region to be heated as well as an outer surface region to be measured which is adjacent to the surface region to be heated, wherein the surface region to be heated and the outer surface region to be measured are arranged at a same side of the test object, wherein the heating device is configured in such way that no heat energy is directly applied to the outer surface region to be measured; and
    an evaluator for evaluating the time profile of the spatial temperature distribution in order to detect a propagation of heat energy within the test object in a direction along the surface region to be measured so as to detect at least one parameter of the near-surface structure at the surface region to be measured.

2. The thermographic examination device as claimed in claim 1, wherein the parameter is a thickness of a wall of the test object.

3. The thermographic examination device as claimed in claim 1, wherein the parameter is a density of a wall of the test object.

4. The thermographic examination device as claimed in claim 1, wherein the surface region to be heated is configured to be point-shaped, to be linear in the form of an open curve, to be linear in the form of a closed curve, to be circular or elliptical.

5. The thermographic examination device as claimed in claim 1, wherein the surface region to be heated comprises at least two spaced-apart surface subregions to be heated, which are parts of the same surface region to be measured.

6. The thermographic examination device as claimed in claim 1, wherein the heater is configured to apply heat energy to the surface region to be heated by means of electromagnetic waves.

7. The thermographic examination device as claimed in claim 1, wherein the heater is configured to apply heat energy to the surface region to be heated by means of mechanical excitation.

8. The thermographic examination device as claimed in claim 1, wherein the heater is configured to apply heat energy to the surface region to be heated by means of heat conduction.

9. The thermographic examination device as claimed in claim 1, wherein the heater is configured to apply heat energy to the surface region to be heated by generating an electrical current at the surface region to be heated.

10. The thermographic examination device as claimed in claim 1, wherein the thermal sensor device comprises a one-dimensional sensor.

11. The thermographic examination device as claimed in claim 1, wherein the thermal sensor device comprises a two-dimensional sensor.

12. The thermographic examination device as claimed in claim 1, wherein the heater is configured to apply heat energy in a simultaneous or time-overlapping manner to several surface regions to be heated, the thermal sensor device being configured to detect, in a simultaneous or time-overlapping manner, those time profiles of the spatial temperature distributions which follow the application of heat energy, on several surface regions of the test object that are to be measured, the surface regions to be measured each comprising one of the surface regions to be heated as well as one outer surface region adjacent to the respective surface region to be heated; and wherein the evaluator is configured to evaluate the time profiles of the spatial temperature distributions in a simultaneously or time-overlapping manner so as to detect in a simultaneously or time-overlapping manner at least one parameter of the near-surface structure at several surface regions to be measured.

13. The thermographic examination device as claimed in claim 1, wherein the evaluator is configured to take into account a spatial profile of an inclination of the surface region to be measured with regard to an optical axis of the thermal sensor device in the evaluation of the time profile of the spatial temperature distribution.

14. The thermographic examination device as claimed in claim 13, the thermographic examination device comprising an inclination detector for detecting the spatial profile of the inclination.

15. The thermographic examination device as claimed in claim 14, wherein the heating device is configured in such way that the application of heat energy to the surface region to be heated of the test object is effected as a function of the spatial profile of the inclination.

16. The thermographic examination device as claimed in claim 1, the thermographic examination device comprising a casting mold for producing a calibration body, in particular a wedge-shaped calibration body.

17. A method for non-destructive examination of a near-surface structure at a test object, comprising:
    directly applying heat energy to a surface region to be heated of the test object by means of a heating device;
    detecting a time profile, following the application of heat energy, of a spatial temperature distribution on a surface region to be measured at the test object by means of a thermal sensor device, the surface region to be measured comprising the surface region to be heated as well as an outer surface region which is adjacent to the surface region to be heated, wherein the surface region to be heated and the outer surface region to be measured are arranged at a same side of the test object, wherein the heating device is configured in such way that no heat energy is directly applied to the outer surface region to be measured; and evaluating the time profile of the spatial temperature distribution by means of an evaluator in order to detect a propagation of heat energy within the test object in a direction along the surface region to be measured so as to detect at least one parameter of the near-surface structure at the surface region to be measured.

\* \* \* \* \*